United States Patent
Wu et al.

(10) Patent No.: US 7,504,450 B2
(45) Date of Patent: Mar. 17, 2009

(54) RESIN COMPOSITIONS

(75) Inventors: Tu-Yi Wu, Kaohsiung (TW); Lung-Lin Hsu, Kaohsiung (TW); Mao-Jung Yeh, Kaohsiung (TW); Chin-Mu Lee, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 96 days.

(21) Appl. No.: 11/148,933

(22) Filed: Jun. 9, 2005

(65) Prior Publication Data

US 2006/0004133 A1 Jan. 5, 2006

(30) Foreign Application Priority Data

Jul. 2, 2004 (TW) ............................... 93120025 A

(51) Int. Cl.
*C08K 3/26* (2006.01)
(52) U.S. Cl. .................. 524/425; 524/430; 524/556
(58) Field of Classification Search .................. 524/425, 524/430, 556
See application file for complete search history.

(56) References Cited

U.S. PATENT DOCUMENTS 5,798,426 A * 8/1998 Anton et al. ........... 526/318.41
6,060,041 A * 5/2000 Candau et al. ................. 424/59
6,783,828 B2 * 8/2004 Fujimaru et al. ........... 428/40.1
2002/0115756 A1 * 8/2002 Lin et al. .................... 524/100
2003/0153671 A1 * 8/2003 Kaszubski et al. .......... 524/492

FOREIGN PATENT DOCUMENTS

| CN | 1412258 | 4/2003 |
| JP | 10329277 | 12/1998 |
| JP | 2004002502 | 1/2004 |

OTHER PUBLICATIONS

JP 07238267A, Murayama Hiroshi, Dec. 9, 1995, Derwent abstract and Machine Translation.*
English Abstract of JP10329277 dated Dec. 15, 1998.
English Abstract of JP2004002502 dated Jan. 8, 2004.
English Abstract of CN1412258 dated Apr. 23, 2003.

* cited by examiner

*Primary Examiner*—Bernard Lipman
(74) *Attorney, Agent, or Firm*—Ladas & Parry LLP

(57) ABSTRACT

The invention pertains to a resin composition capable of absorbing UV light, comprising inorganic particulates and a resin containing as a polymerized unit an acrylate monomer. The composition of the invention can be formulated into a coating for a substrate so as to impart UV resistance and good weatherability to the coated substrate.

13 Claims, No Drawings

RESIN COMPOSITIONS

TECHNICAL FIELD

The subject invention relates to a composition capable of absorbing ultraviolet light. The composition of the invention can be formulated into a coating for a substrate so as to impart UV resistance and good weatherability to the coated substrate.

PRIOR ART

UV light has many adverse effects on human bodies, the environment, and materials. For example, human bodies may suffer from cataracts, skin cancer, skin burns, and skin thickening if overexposed to UV light; and if a material is exposed to UV light over a long period of time, it would become, for example, yellowed, embrittled, and deformed.

For the purpose of reducing the damages caused by UV light, people have been seeking a powerful and effective UV light absorption material, such as a UV light absorbent. However, the UV light absorbent is normally an organic material, such as benzotriazoles, and suffers from the disadvantages of short service life, short duration time, and having toxicity. To eliminate these disadvantages, nanometer-scale inorganic particulates have recently been developed to replace the UV light absorbents.

Although inorganic particulates may overcome the disadvantages associated with UV light absorbents and possess an ability of absorbing UV light better than that of UV light absorbents, they are usually in the form of a powder or sol-gel and are not so easy to be applied to a substrate, unless a binder is incorporated. However, commonly used binders do not possess good weatherability and the coating produced from inorganic particulates in combination with a commonly used binder, upon oxidation and degradation, would become aged, powdered, and cracked, and even come off from the substrate.

After a wide range of research, it has been discovered that when inorganic particulates are incorporated into a resin containing as a polymerized unit an acrylate monomer, not only the UV absorbing properties of the inorganic particulates can be retained but also the weatherability can be improved. The solution provided by the invention may effectively obviate the above-mentioned drawbacks associated with the prior art.

SUMMARY OF THE INVENTION

The primary object of the present invention is to provide a composition capable of absorbing UV light, comprising inorganic particulates and a resin containing as a polymerized unit an acrylate monomer. The composition of the invention can be formulated into a coating to be coated onto a substrate so as to impart UV resistance and good weatherability to the coated substrate.

DETAILED DESCRIPTION OF THE INVENTION

The present invention provides a composition capable of absorbing UV light, comprising inorganic particulates and a resin containing as a polymerized unit an acrylate monomer.

The inorganic particulates capable of absorbing UV light used in the composition of the invention do not require any specific limitations, which may be, for example, but not limited to zinc oxide, silicon dioxide, titanium dioxide, alumina, calcium sulfate, barium sulfate, calcium carbonate or a mixture thereof. The size of the inorganic particulates is usually in the range of 1-100 nanometers, preferably 20-50 nanometers.

The amount of the inorganic particulates in the resin composition according to the invention is 0.01-20%, preferably 1-5% by weight based on the total weight of the composition.

The resin suitable for the composition of the present invention comprises as a polymerized unit an acrylate monomer of the following general formula:

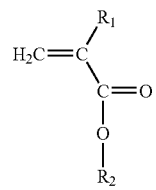

wherein $R_1$ is hydrogen or methyl; and $R_2$ is hydrogen, a $C_6$-$C_{18}$ aromatic group, a $C_1$-$C_{18}$ aliphatic group, a hydroxyalkyl group of formula $C_nH_{2n}OH$ wherein n=2~10, $NH_2$, or $C_{10}H_{17}$.

Preferably, the acrylate monomer used in the composition of the invention is selected from the group consisting of (meth)acrylic acid, methyl (meth)acrylate ethyl (meth)acrylate, butyl (meth)acrylate, isooctyl (meth)acrylate, cyclohexyl (meth)acrylate, and hydroxyethyl (meth)acrylate, and a mixture thereof.

According to the present invention, the resin comprising as a polymerized unit an acrylate monomer may be a polymer formed from only the acrylate monomer or a polymer formed from the acrylate monomer and other monomers such as styrene or a tertiary carboxylic ester.

The tertiary carboxylic ester suitable for use in the present invention is of the following formula:

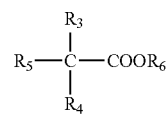

wherein $R_3$, $R_4$, and $R_5$ independently represent a straight chain or branched alkyl of the formula $C_mH_{2m+1}$ in which m is an integer of from 1 to 15, and $R_6$ is a radical selected from the group consisting of:

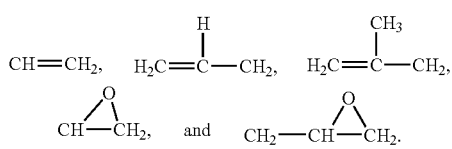

Preferably, the tertiary carboxylic ester is selected from the group consisting of vinyl saturated tertiary decanoate, vinyl saturated tertiary nonanoate, and epoxy propyl saturated tertiary decanoate, and a mixture thereof.

The amount of the resin comprising as a polymerized unit an acrylate monomer in the resin composition of the invention is 99.99-70%, preferably 99-90% by weight on the basis of the total weight of the composition.

The composition of the present invention may optionally comprise a curing agent, so as to form a crosslinking with the binder through the chemical bonding between the molecules. The species of the curing agent suitable for the present invention are well known to those skilled in the art, such as polyisocyanate. The amount of the curing agent in the resin composition of the present invention is in the range of 0-10%, preferably 1-5% by weight on the basis of the total weight of the composition.

The inventive composition may be formulated into a coating by incorporating thereinto additives well known to those skilled in the art. The resultant coating can be applied to the surfaces of any suitable substrates, such as metals, alloys, wooden articles, plastics, polymeric films, or leather articles, so as to impart UV absorbing properties and good weatherability to the surfaces of the substrates.

EXAMPLES

The following examples are merely for further illustration of the present invention, and are not intended to limit the scope of the present invention. Therefore, various variations and modifications, which may be made by those skilled in the art without departing from the spirit of the present invention, are contemplated by this invention.

Example 1

Methyl ethyl ketone and toluene, each of 31.3 g, were added to 157.8 g of an acrylate resin (ETERAC 7361 brand resin, Eternal) (about 50% solids content). The mixture was stirred (at 1000 rpm). Then, 3 g in total of 35 nm zinc oxide/barium sulfate and 15.2 g of a curing agent (DESMODUR 3390 brand curing agent, Bayer) were sequentially added, to form 250.0 g of a coating (40% solids content) which was then coated onto a UX-150 (from Teijin) substrate. After drying, a 10 μm coating film was obtained. After standing for 7 days, a weathering test was conducted (utilizing the QUV weathering tester from Q-panel Company) on the film. The results of the test are shown in Table 1 below.

Example 2

The procedure of Example 1 was repeated, with the exception that the 3 g of 35 nm zinc oxide/barium sulfate was not used. The results of the test are shown in Table 1 below.

Example 3

The procedure of Example 1 was repeated, with the exception that the 35 nm zinc oxide/barium sulfate was replaced with a UV light absorbent (TINUVIN 1130 brand absorbent, Ciba). The results of the test are shown in Table 1 below.

Example 4

The procedure of Example 1 was repeated, with the exception that the acrylate resin was replaced with a styrene-acrylate copolymer (eterac 7315, Eternal). The results of the test are shown in Table 1 below. Table 1: Yellowing Index (YI) Values Varying With the Exposure Time During the QUV Accelerated Weathering Test

|  | Exposure 25 hr ΔYI | Exposure 75 hr ΔYI | Exposure 165 hr ΔYI | Exposure 225 hr Δ-YI |
|---|---|---|---|---|
| EXAMPLE 1 | 0.5 | 0.74 | 0.81 | 0.92 |
| EXAMPLE 2 | 2.45 | 5.69 | 8.13 | 10.34 |

-continued

|  | Exposure 25 hr ΔYI | Exposure 75 hr ΔYI | Exposure 165 hr ΔYI | Exposure 225 hr Δ-YI |
|---|---|---|---|---|
| EXAMPLE 3 | 1.8 | 2.3 | 3.5 | 4.5 |
| EXAMPLE 4 | 0.54 | 1.24 | 1.35 | 2.05 |

A comparison of the results of Example 1 with those of Example 2 reveals that the addition of inorganic particulates to an acrylate resin enhances the resistance to yellowing.

A comparison of the results of Example 1 with those of Example 3 reveals that inorganic particulates are better than an organic UV light absorbent in terms of the resistance to yellowing. Therefore, inorganic particulates absorb UV light better than an organic UV light absorbent does.

A comparison of the results of Example 1 with those of Example 4 reveals that the use of a styrene-acrylate copolymer also achieves an acceptable resistance to yellowing.

What is claimed is:

1. A composition for absorbing UV light, consisting essentially of
   a) 0.01% to 20% by weight of inorganic particulates selected from the group consisting of zinc oxide, titanium dioxide, alumina, calcium sulfate, barium sulfate, calcium carbonate, and a mixture thereof,
   b) 99.99% to 70% by weight of a binder consisting of a resin selected from the group consisting of (i) a resin formed from a monomer of Formula (I) with styrene and (ii) a resin formed from the monomer of Formula (I) with a tertiary carboxylic ester,

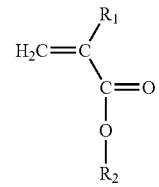

Formula 1 wherein $R_1$ is hydrogen or methyl; and $R_2$ is hydrogen, a $C_6$-$C_{18}$ aromatic group, a $C_1$-$C_{18}$ aliphatic group, or a hydroxyalkyl group of formula $C_nH_{2n}OH$ wherein n=2~10, and c) 0 to 10% by weight of curing means for crosslinking the binder through chemical bonding of molecules thereof, wherein the particle size of said inorganic particulates ranges from 1 to 100 nanometers.

2. The composition of claim 1, wherein the particle size of said inorganic particulates ranges from 20 to 50 nanometers.

3. The composition of claim 1, wherein said monomer is selected from the group consisting of (meth)acrylic acid, methyl (meth)acrylate ethyl (meth)acrylate, butyl (meth)acrylate, isooctyl (meth)acrylate, cyclohexyl (meth)acrylate, and hydroxyethyl (meth)acrylate, and a mixture thereof.

4. A coating for a surface of a substrate, comprising the composition of claim 1.

5. A method of coating a surface of a substrate, comprising applying the composition of claim 1 onto the surface of the substrate.

6. The method of claim 5, wherein said substrate is metal, alloy, wooden article, plastic, polymeric film, or leather article.

7. The composition of claim 1, wherein the composition does not contain an organic UV light absorbent.

8. The composition of claim 1, wherein the resin is present in the composition in an amount of 99-90% by weight of the composition.

9. The composition of claim 8, wherein the inorganic particulates are present in the composition in an amount of 1-5% by weight of the composition.

10. The composition of claim 9, wherein the curing means is present in the composition in an amount of 1-5% by weight of the composition.

11. The composition of claim 10, wherein the curing means consists of a polyisocyanate.

12. The composition of claim 1, wherein the composition consists of components a), b) and c).

13. The composition of claim 1, wherein the composition does not contain silicon dioxide particulates.

* * * * *